(12) United States Patent
Tsuyuzaki et al.

(10) Patent No.: US 10,688,857 B2
(45) Date of Patent: Jun. 23, 2020

(54) VEHICLE BODY STRUCTURE

(71) Applicant: HONDA MOTOR CO., LTD., Minato-ku, Tokyo (JP)

(72) Inventors: Takumi Tsuyuzaki, Wako (JP); Takashi Nitta, Wako (JP); Yoshihiro Nakano, Wako (JP); Toshinobu Miyazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/412,583

(22) Filed: May 15, 2019

(65) Prior Publication Data
US 2019/0359046 A1 Nov. 28, 2019

(30) Foreign Application Priority Data
May 25, 2018 (JP) ................. 2018-100964

(51) Int. Cl.
| | | |
|---|---|---|
| *B60K 1/04* | (2019.01) | |
| *B62D 25/20* | (2006.01) | |
| *B62D 21/03* | (2006.01) | |
| *B60K 11/00* | (2006.01) | |
| *B60L 50/60* | (2019.01) | |
| *B60K 6/28* | (2007.10) | |

(52) U.S. Cl.
CPC ............. *B60K 1/04* (2013.01); *B60K 11/00* (2013.01); *B60L 50/66* (2019.02); *B62D 21/03* (2013.01); *B62D 25/20* (2013.01); *B60K 6/28* (2013.01); *B60K 2001/0438* (2013.01); *B60Y 2200/91* (2013.01); *B60Y 2200/92* (2013.01); *B60Y 2306/05* (2013.01)

(58) Field of Classification Search
CPC .......... B60K 1/04; B60K 11/00; B60L 50/66; B62D 25/20
See application file for complete search history.

(56) References Cited

U.S. PATENT DOCUMENTS

2011/0284298 A1\* 11/2011 Ajisaka .............. B60H 1/00535
180/65.21
2013/0008733 A1\* 1/2013 Gleyzes .................. B60K 1/04
180/243
2017/0246943 A1 8/2017 Salz-breuer et al.

FOREIGN PATENT DOCUMENTS

| JP | 06-263057 | 9/1994 |
|---|---|---|
| JP | 2006-224877 | 8/2006 |
| JP | 2013-150433 | 8/2013 |

OTHER PUBLICATIONS

Japanese Office Action for Japanese Patent Application No. 2018-100964 dated Oct. 15, 2019.

\* cited by examiner

*Primary Examiner* — John D Walters
*Assistant Examiner* — James J Triggs
(74) *Attorney, Agent, or Firm* — Amin, Turocy & Watson, LLP (57) ABSTRACT

A vehicle body structure includes a battery pack provided below a floor panel, a floor tunnel provided on the floor panel and protruding upward, and a reinforcement member fixed to a lower surface of the floor panel below an apex section of the floor tunnel and extending in a vehicle width direction, wherein a routing member is provided between the reinforcement member and the floor tunnel.

5 Claims, 8 Drawing Sheets

VEHICLE BODY STRUCTURE

CROSS-REFERENCE TO RELATED APPLICATION

Priority is claimed on Japanese Patent Application No. 2018-100964, filed May 25, 2018, the content of which is incorporated herein by reference.

BACKGROUND OF THE INVENTION

Field of the Invention

The present invention relates to a vehicle body structure.

Description of Related Art

In a vehicle body structure, a configuration in which a floor panel is provided between left and right extension side members (hereinafter, referred to as left and right side sills) and a battery pack is provided below the floor panel is known. In the battery pack, a battery (a plurality of cells) is accommodated in a battery case. In addition, a floor tunnel is provided on the floor panel, and the floor tunnel extends in a vehicle body forward/rearward direction while being open downward. The battery pack is disposed on an opening side of the floor tunnel (for example, see Japanese Unexamined Patent Application, First Publication No. 2006-224877).

SUMMARY OF THE INVENTION

However, the floor tunnel extends in the vehicle body forward/rearward direction while being open downward. Accordingly, it is difficult to secure rigidity for the floor tunnel with respect to an impact load input to a vehicle body in a vehicle width direction. That is, when an impact load is input from a side of the vehicle body due to a side collision of the vehicle body, the floor tunnel (i.e., the vehicle body) is easily deformed. For this reason, in order to secure rigidity for the floor tunnel with respect to an impact load due to a side collision, for example, a reinforcement member such as a cross member or the like below the floor panel is required.

However, in a vehicle body including a battery pack (i.e., the battery) below the floor panel, a large capacity for the battery is preferably secured. For this reason, in a state in which a large capacity for the battery is secured, it is difficult to dispose a reinforcement member such as a cross member or the like below the floor panel.

An aspect of the present invention is directed to providing a vehicle body structure capable of minimizing deformation of a vehicle body (a vehicle body structure) with respect to a side collision and in which a larger capacity for a battery is able to be secured.

(1) A vehicle body structure according to the present invention includes a battery pack provided below a floor panel; a floor tunnel provided on the floor panel and protruding upward; and a reinforcement member fixed to a lower surface of the floor panel below an apex section of the floor tunnel and extending in a vehicle width direction, wherein a routing member is provided between the reinforcement member and the floor tunnel.

According to the aspect of the above-mentioned (1), the floor panel is provided below the apex section of the floor tunnel, and the reinforcement member is provided on the lower surface of the floor panel. An opening section of a lower end portion of the floor tunnel can be connected to the reinforcement member. Accordingly, rigidity of the floor tunnel with respect to an impact load in the vehicle width direction can be secured. Accordingly, when a load is input from a side of the vehicle body due to a side collision, deformation of the vehicle body (a vehicle body structure), in particular, deformation of the floor tunnel can be suppressed.

In addition, a space is formed between the reinforcement member and the floor tunnel. The routing member is provided in the space. Accordingly, the space between the reinforcement member and the floor tunnel can be effectively used, and space efficiency of the vehicle body can be improved. That is, rigidity of the floor tunnel can be secured without providing a cross member on a lower surface of the floor panel. Accordingly, a space below the floor panel can be enlarged and a large capacity for a battery pack (i.e., a battery) can be secured.

(2) In the aspect of the above-mentioned (1), the routing member may be fixed to the reinforcement member.

According to the aspect of the above-mentioned (2), when the routing member is fixed to the reinforcement member, the routing member can be easily assembled to the vehicle body while being attached to the reinforcement member. In addition, when the routing member is provided on the reinforcement member, the reinforcement member can also function as a member configured to support the routing member. In other words, the member configured to support the routing member can also function as the reinforcement member. Accordingly, an attachment strength or support strength of the routing member can be improved without increasing the number of members configured to support the routing member.

(3) In the aspect of the above-mentioned (1) or (2), a cross member extending in the vehicle width direction may be provided in the battery pack, and the reinforcement member may be disposed above the cross member.

According to the aspect of the above-mentioned (3), the cross member is provided in the battery pack, and the reinforcement member is provided above the cross member. Accordingly, strength of the floor tunnel with respect to the impact load in the vehicle width direction can be improved by the cross member and the reinforcement member. Accordingly, when an impact load is input from a side of the vehicle body due to a side collision, the impact load can be supported by the cross member and the reinforcement member.

In addition, when the impact load is supported by the cross member and the reinforcement member, an influence of the impact load on attachment of the routing member can be minimized.

(4) In the aspect of any one of the above-mentioned (1) to (3), the routing member may be constituted by: a cooling pipeline configured to cool a driving source of a vehicle body rear section; and an electrical wire configured to supply electric power to the driving source, and the electrical wire may be disposed on a side closer to a central in the vehicle width direction compared to the cooling pipeline.

According to the aspect of the above-mentioned (4), the electrical wire is located (disposed) on the side closer to a central in the vehicle width direction compared to the cooling pipeline. Accordingly, the electrical wire can be separated from the side collision position. Accordingly, when the impact load is input from a side of the vehicle body due to the side collision, in particular, transmission of the impact load to the electrical wire can be minimized, and deformation of the electrical wire can be suppressed.

(5) In the aspect of any one of the above-mentioned (1) to (4), an over-tunnel reinforcement member disposed above the floor tunnel and fixed to an upper surface of the floor panel may be provided, and the over-tunnel reinforcement member and the reinforcement member may be fixed with each other via the floor panel.

According to the aspect of the above-mentioned (5), the over-tunnel reinforcement member is disposed above the floor tunnel and the over-tunnel reinforcement member and the reinforcement member are fixed together (collectively) via the floor panel. Accordingly, the over-tunnel reinforcement member can be strongly supported by a reinforcement member. That is, a coupling strength of the over-tunnel reinforcement member can be improved, and a strength of the over-tunnel reinforcement member with respect to the impact load due to the side collision can be improved.

Accordingly, when the impact load is input from a side of the vehicle body due to the side collision, deformation of the vehicle body (in particular, the floor tunnel) can be more appropriately suppressed.

(6) In the aspect of any one of the above-mentioned (1) to (5), the vehicle body structure may include a driving source provided on the vehicle body rear section; and a cooling apparatus provided on a vehicle body front section and configured to cool the driving source.

According to the aspect of the above-mentioned (6), the driving source is provided on the vehicle body rear section and the cooling apparatus is provided on the vehicle body front section. The driving source is cooled by the cooling apparatus. Accordingly, there is a need to extend a pipeline configured to cool the driving source in the vehicle body forward/rearward direction.

Here, rigidity of the floor tunnel with respect to the impact load in the vehicle width direction is secured by the reinforcement member. Further, a space is secured between the floor tunnel and the reinforcement member. Since the pipeline is disposed in the space, the pipeline can extend in the vehicle body forward/rearward direction.

Accordingly, a large space below the floor panel can be secured. Accordingly, in a state in which a capacity of the battery is largely secured, the pipeline can extend in the vehicle body forward/rearward direction, and the driving source and the cooling apparatus can be connected by the pipeline.

According to the aspect of the present invention, the opening section of the floor tunnel is connected to the reinforcement member, and the routing member is provided in the space between the reinforcement member and the floor tunnel. Accordingly, deformation of the vehicle body (a vehicle body structure) with respect to the side collision can be suppressed, and further, a large capacity of the battery can be secured.

DETAILED DESCRIPTION OF THE INVENTION

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Figure 1:
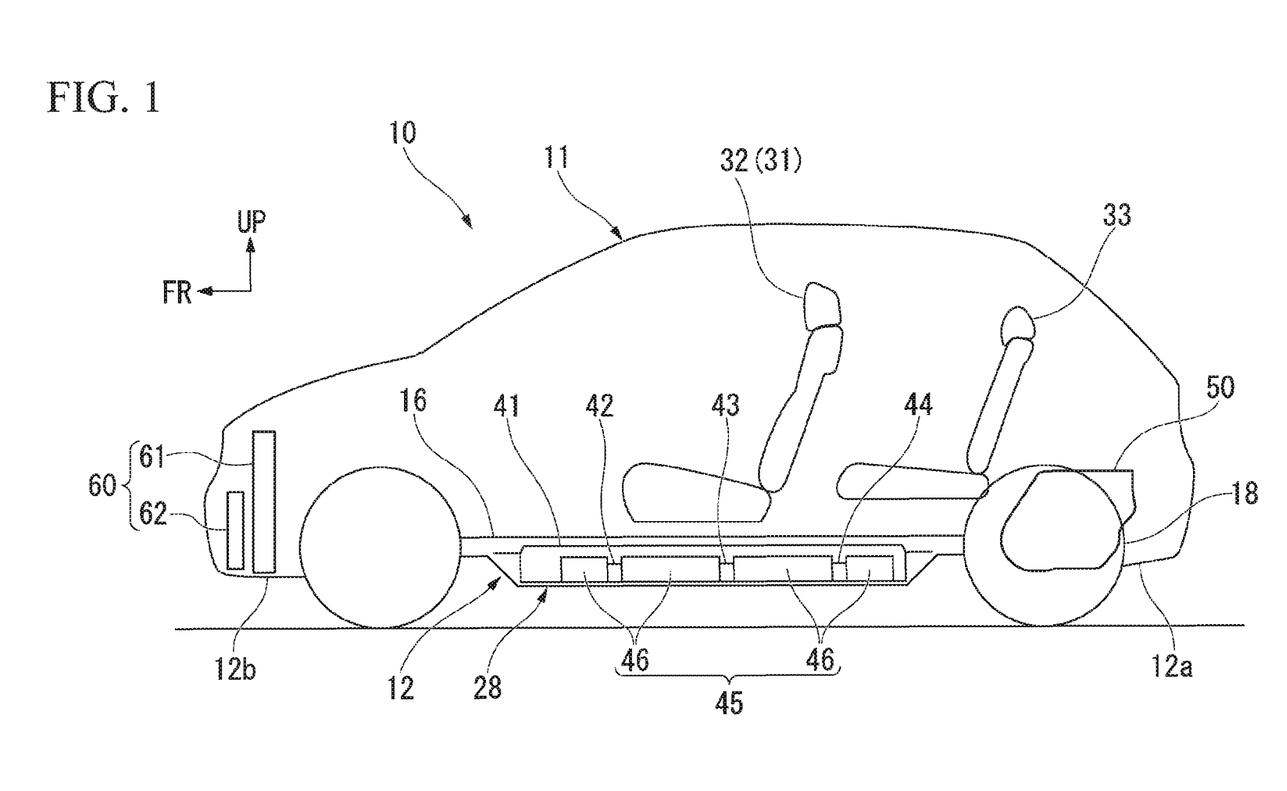
FIG. 1 is a schematic side view showing a state in which a vehicle according to an embodiment of the present invention is seen from a side.
Figure 2:
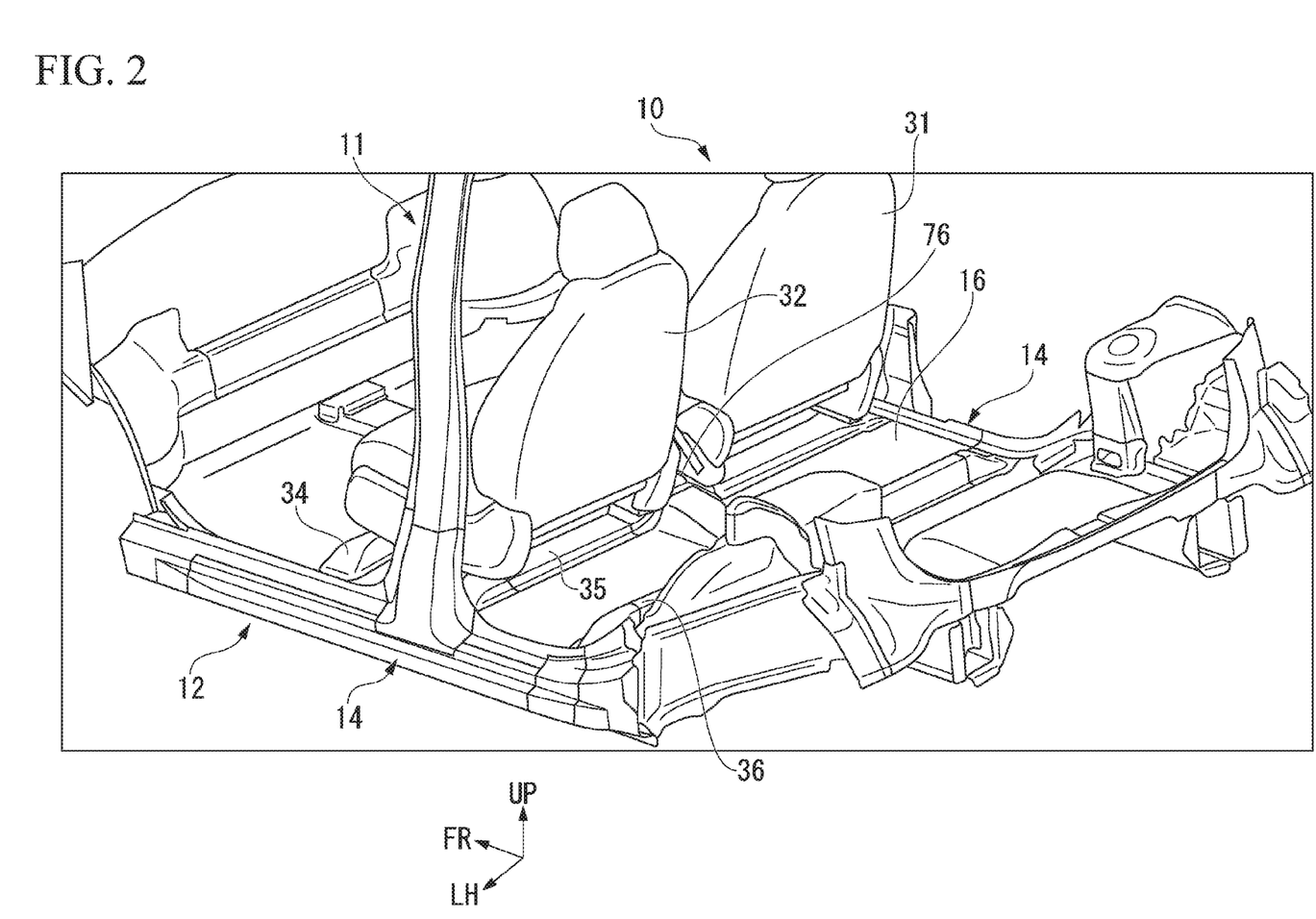
FIG. 2 is a perspective view showing a vehicle body structure of the vehicle according to the embodiment of the present invention viewed obliquely from above a left side of a rear section.
Figure 3:
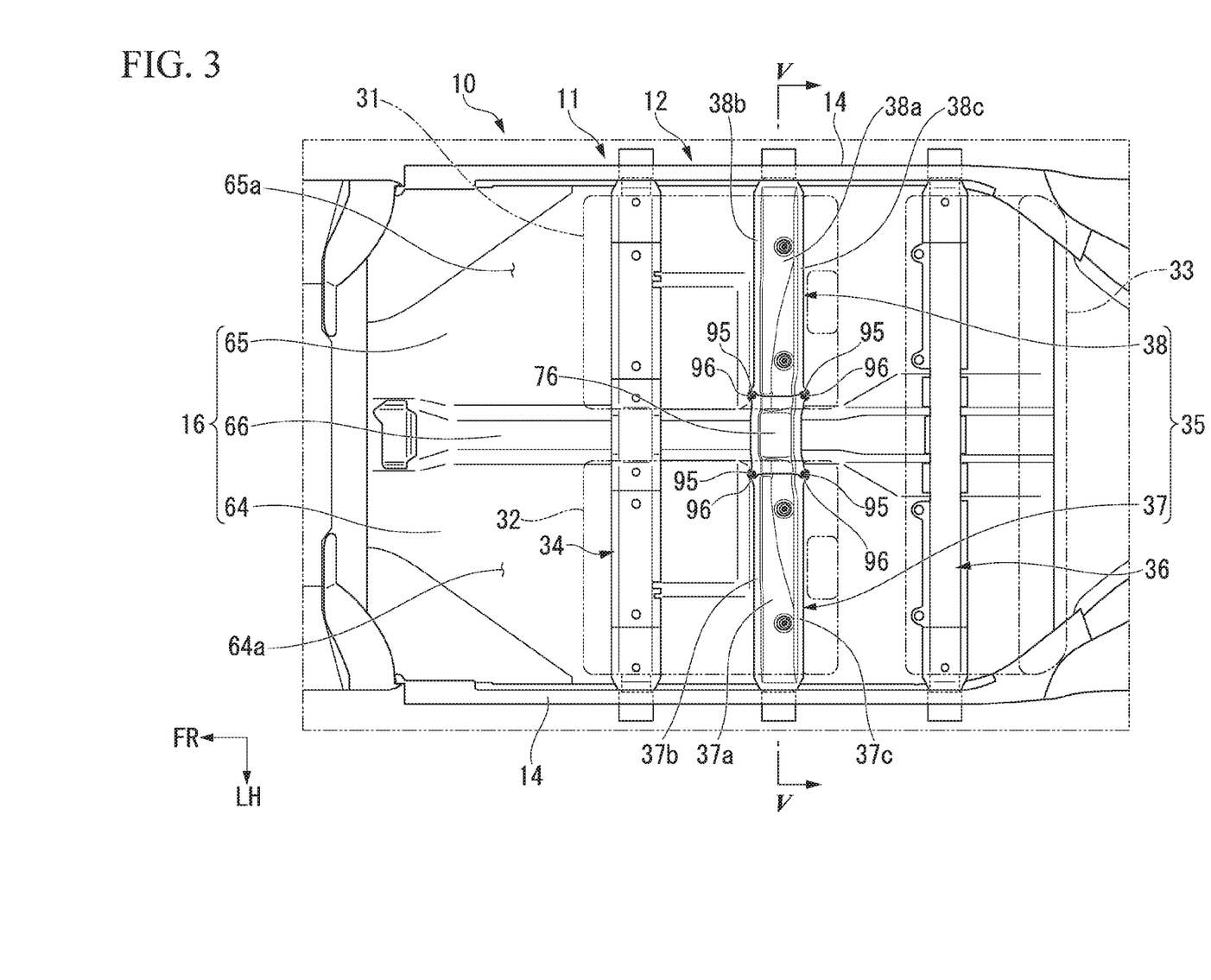
FIG. 3 is a plan view showing a lower structure of the vehicle according to the embodiment of the present invention.

FIG. 1 is a schematic side view showing a state in which a vehicle 10 according to the embodiment is seen from a side. FIG. 2 is a perspective view showing a vehicle body structure 11 of the vehicle 10 according to the embodiment from above of an inclined left side of a rear section. FIG. 3 is a plan view showing a lower structure 12 of the vehicle 10 according to the embodiment.

As shown in FIG. 1 to FIG. 3, for example, while an electric automobile is exemplified as the vehicle 10, a configuration of the present invention can also be applied to another vehicle such as a hybrid automobile or the like.

The vehicle 10 includes the vehicle body structure 11 that constitutes a vehicle skeleton section or the like. The vehicle body structure 11 includes the lower structure 12, a driving source 50 and a cooling apparatus 60. The lower structure 12 constitutes a lower section of the vehicle body structure 11, the driving source 50 is provided on a rear end portion (a vehicle body rear section) 12a, and the cooling apparatus 60 is provided on a front end portion (a vehicle body front section) 12b.

Specifically, the lower structure 12 includes a left side sill 14 and a right side sill 14, a floor panel 16 that bridges between the left and right side sills 14, and a plurality of floor cross members 34, 35 and 36 disposed on an upper surface side of the floor panel 16.

Figure 4:
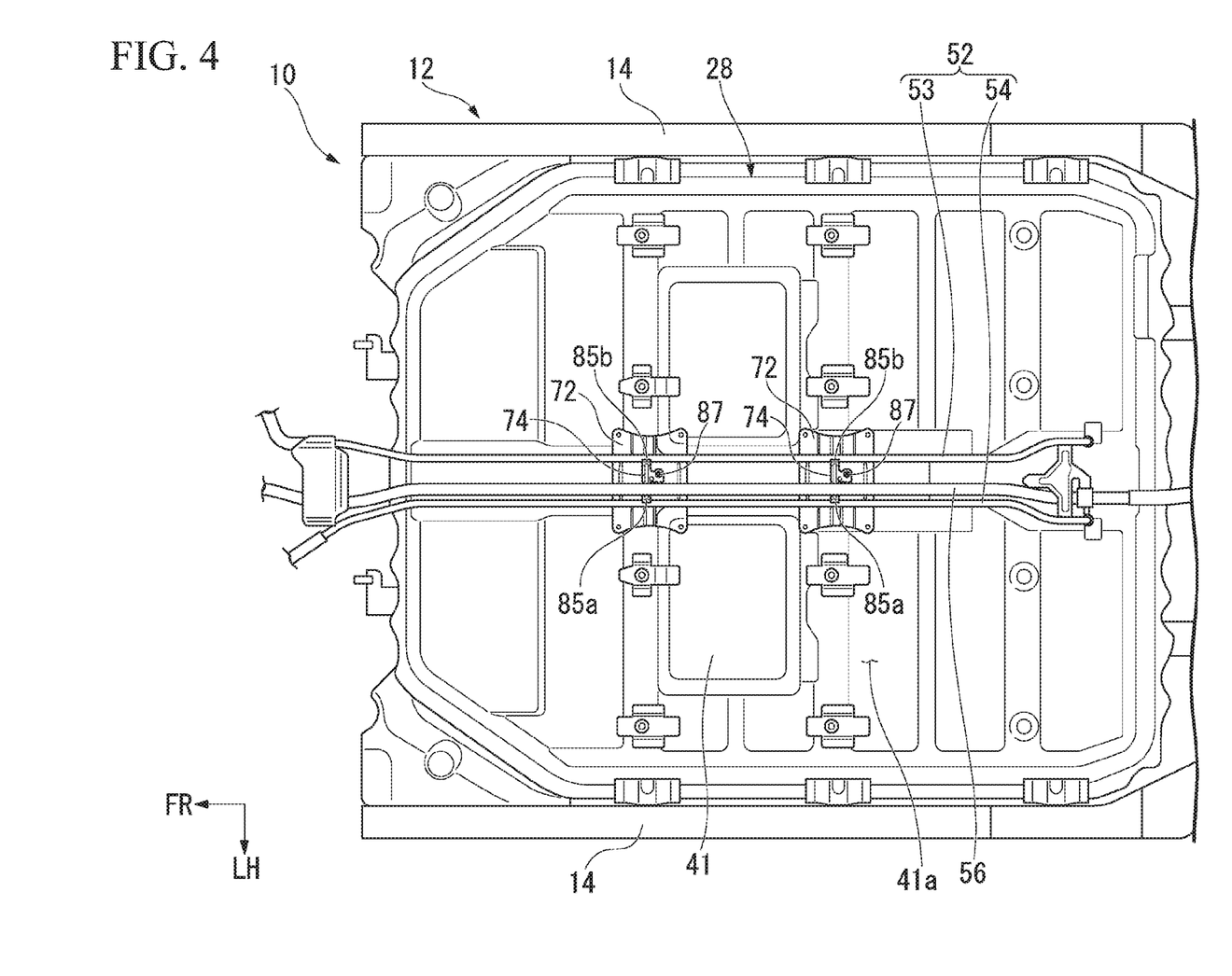
FIG. 4 is a plan view showing a state in which a floor panel is removed from the lower structure according to the embodiment of the present invention.

In addition, the lower structure 12 includes a battery pack 28 provided below the floor panel 16, a battery 45 provided in the battery pack 28, a lower reinforcement member (a reinforcement member) 72, a pipeline fixing member 74 and an over-tunnel reinforcement member 76. The lower reinforcement member 72 and the pipeline fixing member 74 are shown in FIG. 4.

The left and right side sills 14 are disposed on left and right side portions of a lower end side of the vehicle 10, and extend in a forward/rearward direction of the vehicle 10. The floor panel 16 forms a floor section of a passenger compartment by having both end portions in a vehicle width direction bridge between the left and right side sills 14.

The floor cross members 34, 35 and 36 extend in the vehicle width direction, and both end portions in an extension direction are coupled to the left and right side sills 14.

The floor cross members 34, 35 and 36 are disposed to be separated in the vehicle body forward/rearward direction.

In the vehicle 10, for example, a driver seat 31 and a passenger seat 32 installed in the passenger compartment are attached to the two floor cross members 34 and 35 of a front side of the vehicle body. In addition, a rear seat 33 installed in the passenger compartment is attached to the floor cross member 36 on a rear side of the vehicle body.

The floor cross members 34, 35 and 36 will be described below in detail. Further, the floor cross members 34, 35 and 36 are similar members, and hereinafter, the floor cross member 35 will be described in detail and detailed description of the floor cross members 34 and 36 will be omitted.

FIG. 4 is a plan view showing a state in which the floor panel 16 is removed from the lower structure 12 according to the embodiment.

As shown in FIG. 1 and FIG. 4, the battery pack 28 that bridges between the left and right side sills 14 is provided between the left and right side sills 14 and below the floor panel 16. For example, an intelligent power unit (IPU) or the like is included in the battery pack 28. The IPU is obtained by integrating a power control unit (PCU) configured to control selection of a drive mode or regenerative deceleration according to traveling circumstances and a battery residual quantity of the vehicle 10 and the battery 45.

Figure 5:
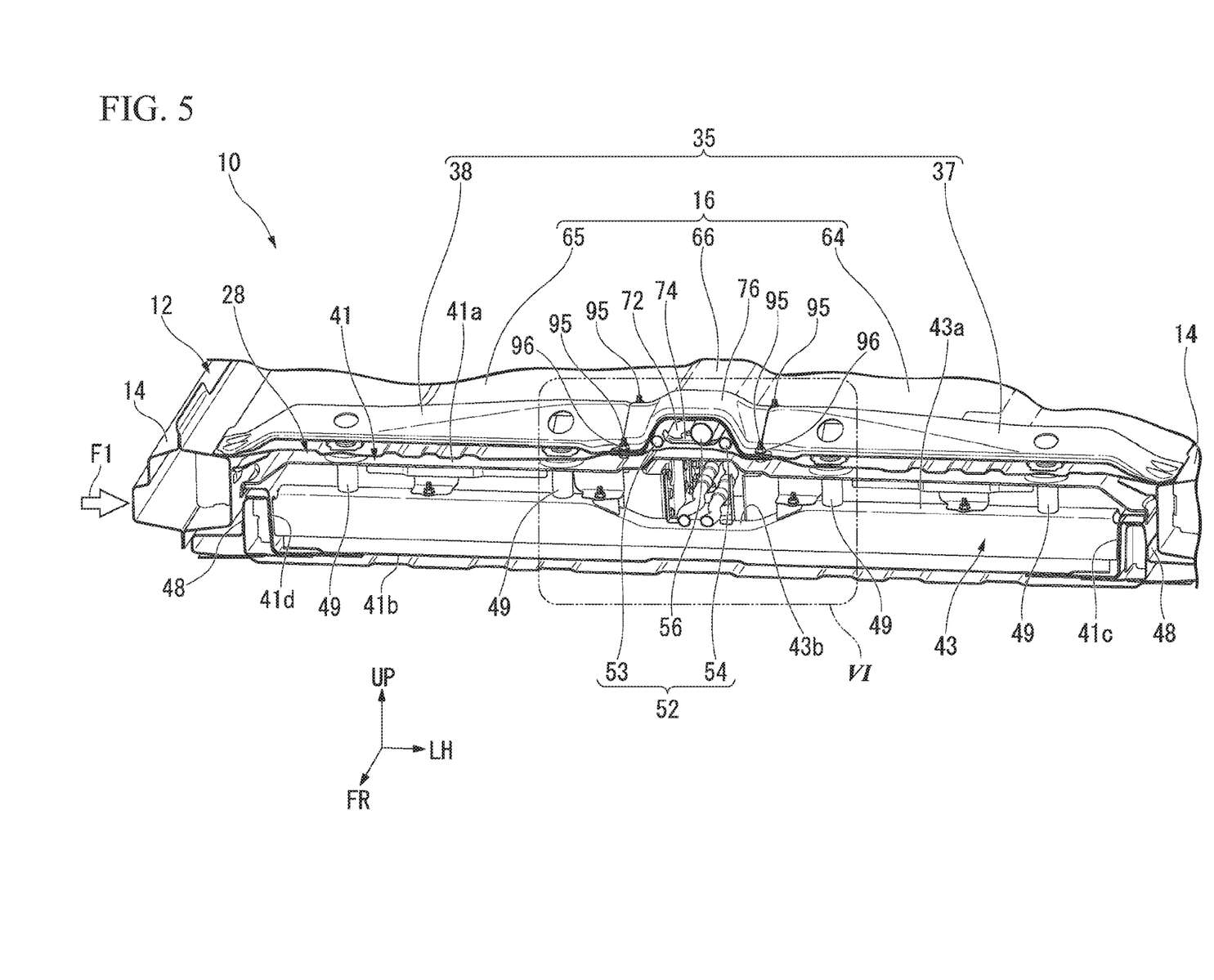
FIG. 5 is a cross-sectional view of the lower structure according to the embodiment of the present invention taken along line V-V in FIG. 3.

FIG. 5 is a cross-sectional view taken along line V-V in FIG. 3 of the lower structure 12 according to the embodiment.

As shown in FIG. 1 and FIG. 5, the battery pack 28 includes a battery case 41, a plurality of case cross members (cross members) 42, 43 and 44 and the battery 45 (a plurality of cells 46).

In the battery case 41, a left side portion is attached to the left side sill 14 via a left side frame 48, and a right side portion is attached to the right side sill 14 via a right side frame 48. In addition, a case apex section 41a of the battery case 41 is connected to the floor panel 16 via a plurality of connecting members 49.

The plurality of case cross members 42, 43 and 44 are disposed in the battery case 41 at intervals in the vehicle body forward/rearward direction, and extend in the vehicle width direction.

The case cross members 42, 43 and 44 are similar members, and hereinafter, the case cross member 43 will be described in detail and detailed description of the case cross members 42 and 44 will be described.

A lower end portion of the case cross member 43 is coupled to a case bottom section 41b of the battery case 41. In addition, a left end portion of the case cross member 43 is coupled to a case left sidewall 41c of the battery case 41. A right end portion of the case cross member 43 is coupled to a case right sidewall 41d of the battery case 41.

Further, an upper end portion 43a of the case cross member 43 is connected to the case apex section 41a of the battery case 41 via the plurality of connecting members 49. The case cross member 43 has a center concave section 43b at a center in the vehicle width direction. The center concave section 43b is recessed in a U shape directed downward from the upper end portion 43a of the case cross member 43.

In this state, the case cross member 43 is disposed below the floor cross member 35. In addition, the case cross member 42 is disposed below the floor cross member 34 (see FIG. 3). Further, the case cross member 44 is disposed below the floor cross member 36 (see FIG. 3).

The driving source 50 is provided on a vehicle body rear side of the battery pack 28 (i.e., the rear end portion 12a of the lower structure 12). For example, a motor 50 is exemplified as the driving source 50. That is, the vehicle 10 is a rear driving structure in which a rear wheel 18 is driven by the motor 50.

The cooling apparatus 60 is provided on a vehicle body front side of the battery pack 28 (i.e., the front end portion 12b of the lower structure 12). For example, a radiator 61 or a condenser 62 is exemplified as the cooling apparatus 60. Cooling water is cooled by the radiator 61, and the motor 50 or the PCU is cooled by the cooling water. In addition, coolant in an air-conditioning apparatus is cooled by the condenser 62.

Returning to FIG. 1 and FIG. 4, the motor 50 or the PCU is connected to, for example, the radiator 61 by a cooling pipeline (a routing member) 52. The cooling pipeline 52 includes a first cooling pipeline 53 and a second cooling pipeline 54. The first cooling pipeline 53 is a pipeline formed in, for example, a tubular shape, and configured to guide the cooling water cooled by the radiator 61 from the radiator 61 to the motor 50, the PCU, or the like. The second cooling pipeline 54 is a pipeline formed in, for example, a tubular shape, and configured to guide the cooling water from the motor 50 or the PCU to the radiator 61.

The cooling water cooled by the radiator 61 is guided to the motor 50, the PCU, or the like, through the first cooling pipeline 53, and the motor 50, the PCU, or the like, is cooled by the cooling water. The cooling water that has cooled the motor 50, the PCU, or the like, is guided to the radiator 61 through the second cooling pipeline 54.

The motor 50 is connected to, for example, the battery 45 by a high voltage electrical wire (a routing member, an electrical wire) 56. When the motor 50 is connected to the battery 45 by the high voltage electrical wire 56, electric power is supplied to the motor 50 from the battery 45.

Figure 6:
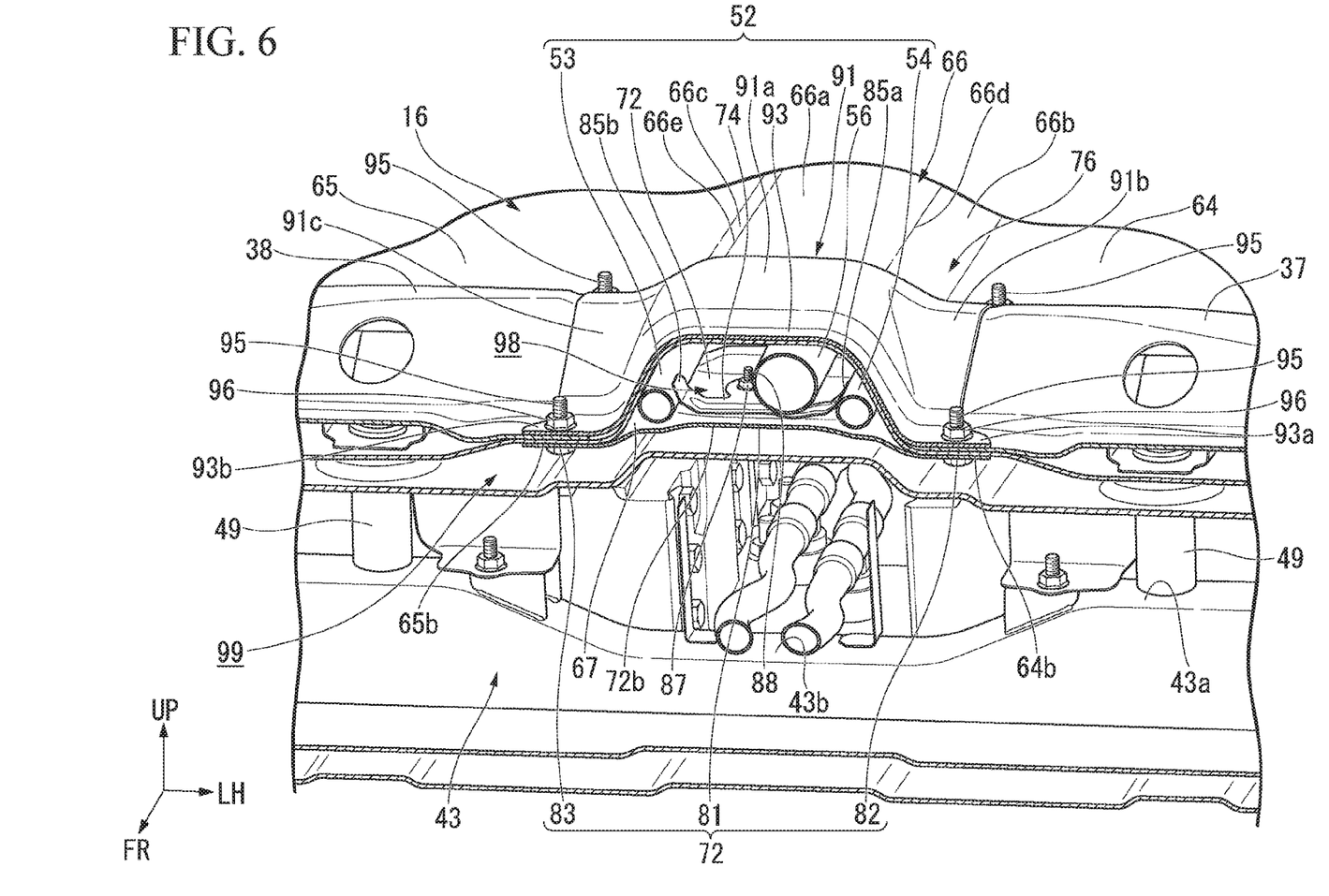
FIG. 6 is an enlarged cross-sectional view of a portion VI in FIG. 5 of the lower structure according to the embodiment of the present invention.

FIG. 6 is an enlarged cross-sectional view of a portion VI in FIG. 5 of the lower structure 12 according to the embodiment.

As shown in FIG. 5 and FIG. 6, the first cooling pipeline 53, the second cooling pipeline 54 and the high voltage electrical wire 56 are disposed above the battery pack 28 and below a floor tunnel 66 (to be described below). The first cooling pipeline 53, the second cooling pipeline 54 and the high voltage electrical wire 56 extend in the vehicle body forward/rearward direction at a center in the vehicle width direction (see FIG. 4).

The first cooling pipeline 53 is disposed on a right side of the center in the vehicle width direction. The second cooling pipeline 54 is disposed on a left side of the center in the vehicle width direction. The first cooling pipeline 53 and the second cooling pipeline 54 are disposed with an interval therebetween in the vehicle width direction. Further, the high voltage electrical wire 56 is disposed between the first cooling pipeline 53 and the second cooling pipeline 54. That is, the high voltage electrical wire 56 is positioned (disposed) on the side closer to the center in the vehicle width direction compared to the first cooling pipeline 53 and the second cooling pipeline 54.

The floor panel 16 includes a left floor panel section 64, a right floor panel section 65 and the floor tunnel 66. The left floor panel section 64 is coupled to the left side sill 14 and formed integrally with the floor tunnel 66. The right floor panel section 65 is coupled to the right side sill 14 and formed integrally with the floor tunnel 66.

The floor tunnel 66 is integrally provided on a right side of the left floor panel section 64 and a left side of the right floor panel section 65. The floor tunnel 66 protrudes upward from the right side of the left floor panel section 64 and the left side of the right floor panel section 65 and extends in the vehicle body forward/rearward direction.

The floor tunnel 66 has a tunnel apex section 66a, a left tunnel inclined wall 66b and a right tunnel inclined wall 66c. The tunnel apex section 66a is disposed above the left floor panel section 64 and the right floor panel section 65.

The left tunnel inclined wall 66b extends downward and toward a leftward side in an inclined shape from a left side 66d of the tunnel apex section 66a to a right side of the left floor panel section 64. The right tunnel inclined wall 66c extends downward and toward a leftward side in an inclined shape from a right side 66e of the tunnel apex section 66a to a left side of the right floor panel section 65.

That is, the floor tunnel 66 protrudes upward from the right side of the left floor panel section 64 and the left side of the right floor panel section 65 in a U-shaped cross section, and extends in the vehicle body forward/rearward direction.

Figure 7:
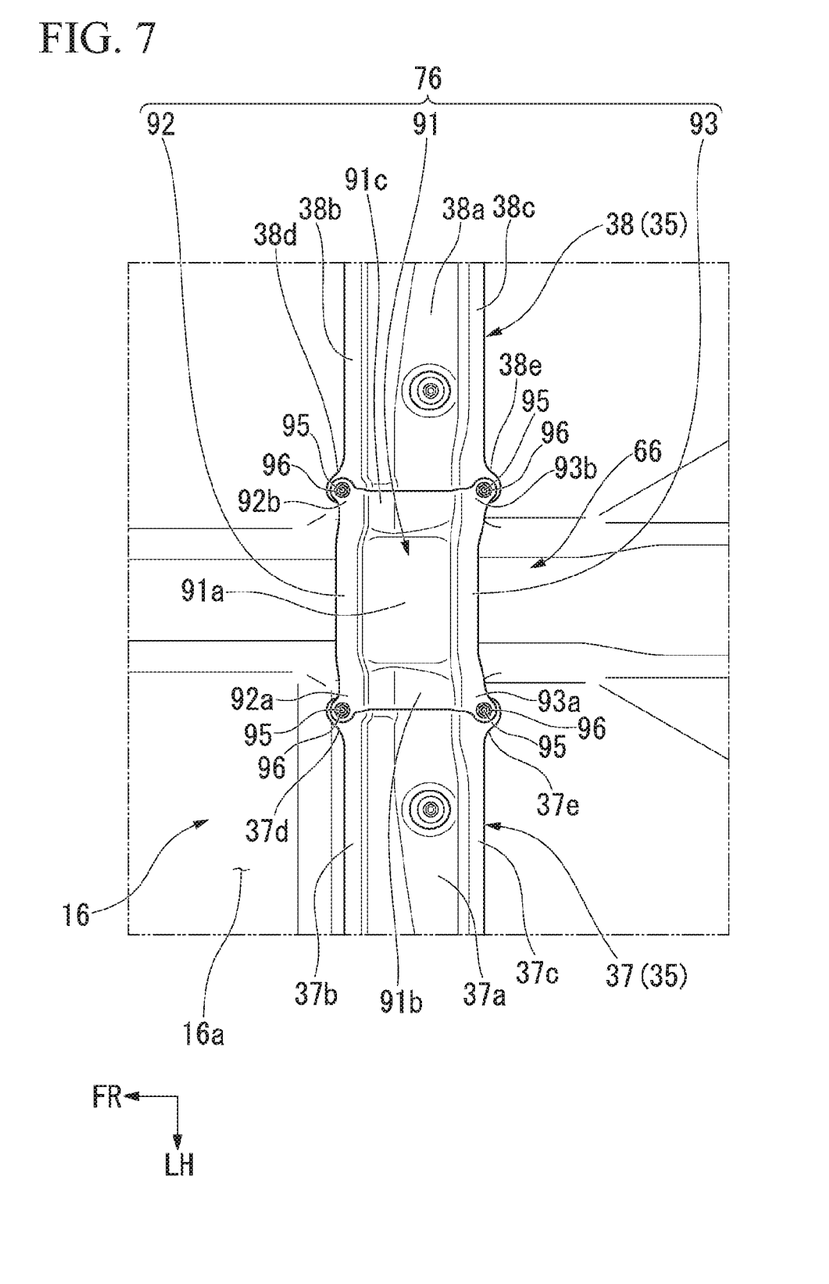
FIG. 7 is an enlarged cross-sectional view of a main part in FIG. 3 of the lower structure according to the embodiment of the present invention.

FIG. 7 is an enlarged cross-sectional view of a main part in FIG. 3 of the lower structure 12 according to the embodiment.

As shown in FIG. 3 and FIG. 7, the floor cross member 35 includes a left cross member section 37 and a right cross member section 38. The left cross member section 37 bridges between the left side sill 14 and the floor tunnel 66 and extends in the vehicle width direction.

The left cross member section 37 has a left member protruding section 37a, a left member front protruding section 37b and a left member rear protruding section 37c. The left member protruding section 37a protrudes upward from the left floor panel section 64 in a U-shaped cross section. The left member front protruding section 37b overhangs from a front side of the left member protruding section 37a toward a front side of the vehicle body along an upper surface 64a of the left floor panel section 64. The left member rear protruding section 37c overhangs from a rear side of the left member protruding section 37a toward a rear side of the vehicle body along the upper surface 64a of the left floor panel section 64.

When the left member front protruding section 37b and the left member rear protruding section 37c are coupled to the upper surface 64a of the left floor panel section 64, the left cross member section 37 is fixed to the upper surface 64a of the left floor panel section 64.

The right cross member section 38 bridges between the right side sill 14 and the floor tunnel 66 and extends in the vehicle width direction.

The right cross member section 38 has a right member protruding section 38a, a right member front protruding section 38b and a right member rear protruding section 38c. The right member protruding section 38a protrudes upward from the right floor panel section 65 in a U-shaped cross section. The right member front protruding section 38b overhangs from a front side of the right member protruding section 38a toward a front side of the vehicle body along an upper surface 65a of the right floor panel section 65. The right member rear protruding section 38c overhangs from a rear side of the right member protruding section 38a toward a rear side of the vehicle body along the upper surface 65a of the right floor panel section 65.

When the right member front protruding section 38b and the right member rear protruding section 38c are coupled to the upper surface 65a of the right floor panel section 65, the right cross member section 38 is fixed to the upper surface 65a of the right floor panel section 65.

Figure 8:
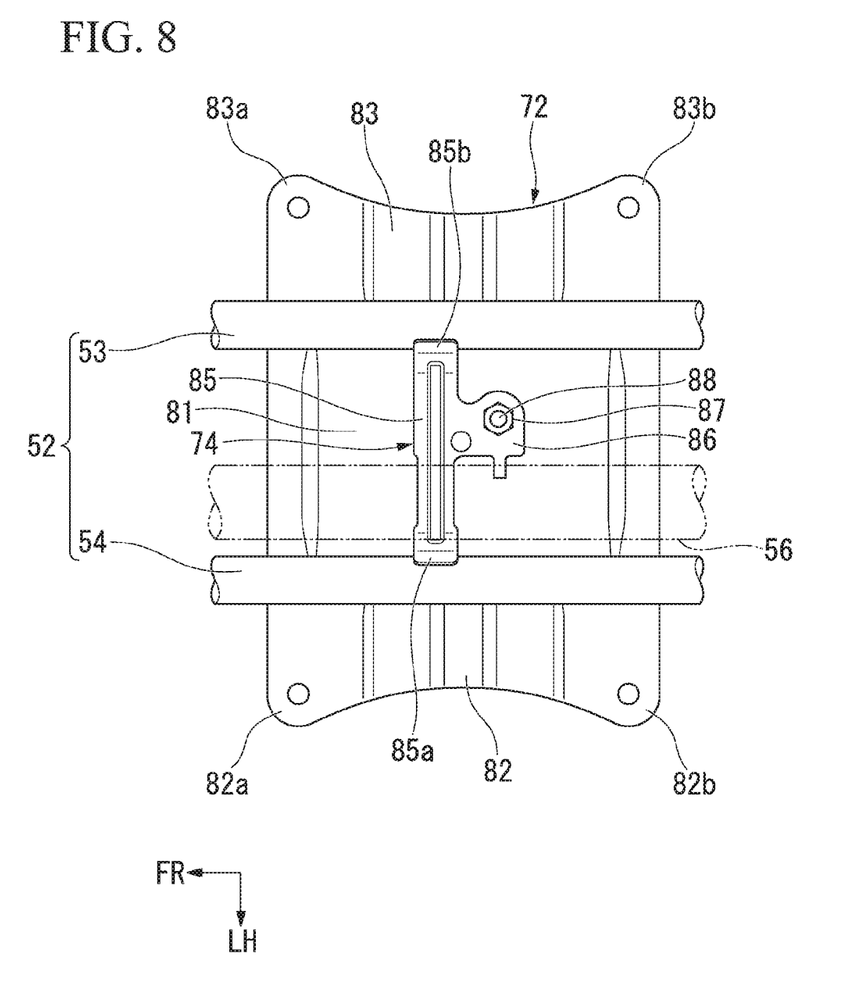
FIG. 8 is an enlarged cross-sectional view of a main part in FIG. 4 of the lower structure according to the embodiment of the present invention.

FIG. 8 is an enlarged cross-sectional view of the main part in FIG. 4 of the lower structure according to the embodiment.

As shown in FIG. 6 and FIG. 8, the lower reinforcement member 72 is provided below the floor cross member 35 and below the floor tunnel 66. The lower reinforcement member 72 is formed in a panel shape using a plate member having a rectangular shape when seen in a plan view. The lower reinforcement member 72 includes a lower reinforcement central section 81, a lower reinforcement left side portion 82 and a lower reinforcement right side portion 83.

The lower reinforcement left side portion 82 is fixed to a lower surface 64b of the left floor panel section 64 on a right side through, for example, welding or the like. The lower reinforcement right side portion 83 is fixed to a lower surface 65b of the right floor panel section 65 on a left side through, for example, welding or the like.

The lower reinforcement member 72 bridges between the lower surface 64b of the left floor panel section 64 on the right side and the lower surface 65b of the right floor panel section 65 on the left side. Accordingly, an opening section 67 of a lower end portion of the floor tunnel 66 can be connected to the lower reinforcement member 72.

In this state, the lower reinforcement central section 81 is disposed below the floor tunnel 66. In addition, the lower reinforcement left side portion 82 is disposed below a right end portion of the left cross member section 37.

A front end portion 82a of the lower reinforcement left side portion 82 overlaps a right end portion 37d (see FIG. 7) of the left member front protruding section 37b via a right side of the left floor panel section 64. A rear end portion 82b of the lower reinforcement left side portion 82 overlaps a right end portion 37e (see FIG. 7) of the left member rear protruding section 37c via a right side of the left floor panel section 64.

In addition, the lower reinforcement right side portion 83 is disposed below a left end portion of the right cross member section 38.

A front end portion 83a of the lower reinforcement right side portion 83 overlaps a left end portion 38d (see FIG. 7) of the right member front protruding section 38b via a left side of the right floor panel section 65. A rear end portion 83b of the lower reinforcement right side portion 83 overlaps a left end portion 38e (see FIG. 7) of the right member rear protruding section 38c via a left side of the right floor panel section 65.

In this state, the lower reinforcement member 72 is fixed to the lower surfaces 64b and 65b of the floor panel 16 below the tunnel apex section 66a of the floor tunnel 66, and further, extends in the vehicle width direction. In addition, the lower reinforcement member 72 is disposed above the center concave section 43b of the case cross member 43.

As described in FIG. 5, the case cross member 43 is provided in the battery pack 28 and the lower reinforcement member 72 is provided above the case cross member 43. Accordingly, strength of the floor tunnel 66 with respect to an impact load F1 in the vehicle width direction generated due to a side collision can be improved by the case cross member 43 and the lower reinforcement member 72. Accordingly, when the impact load F1 is input from a side of the vehicle body due to the side collision, the impact load F1 can be supported by the case cross member 43 and the lower reinforcement member 72.

In addition, when the impact load F1 is supported by the case cross member 43 and the lower reinforcement member 72, it is possible to minimize an influence of the impact load F1 applied to an attachment state of the first cooling pipeline 53 and the second cooling pipeline 54 or a supporting state of the high voltage electrical wire 56.

The pipeline fixing member 74 is provided on an upper surface 72a of the lower reinforcement member 72.

Returning to FIG. 6 and FIG. 8, the pipeline fixing member 74 has a fixed section 85 extending in the vehicle width direction, and an attachment section 86 protruding from the fixed section 85 toward a rear side of the vehicle body.

The fixed section 85 extends along the upper surface 72a of the lower reinforcement member 72 in the vehicle width direction. A left end portion 85a of the fixed section 85 extends upward in an inclined shape to be separated from the upper surface 72a of the lower reinforcement member 72 along a second outer circumferential surface of the second cooling pipeline 54. "The left end portion 85a of the fixed section 85" is referred to as "a fixed left end portion 85a."

The fixed left end portion 85a is fixed to the second outer circumferential surface through, for example, brazing, while coming in contact with the second outer circumferential surface of the second cooling pipeline 54.

A right end portion 85b of the fixed section 85 extends upward in an inclined shape to be separated from the upper surface 72a of the lower reinforcement member 72 along the first outer circumferential surface of the first cooling pipeline 53. "The right end portion 85b of the fixed section 85" is referred to as "a fixed right end portion 85b." The fixed right end portion 85b is fixed to the second outer circumferential surface through, for example, brazing, while coming in contact with the first outer circumferential surface of the first cooling pipeline 53.

In the embodiment, while the example in which the fixed left end portion 85a is fixed to the second outer circumferential surface of the second cooling pipeline 54 through brazing and the fixed right end portion 85b is fixed to the first outer circumferential surface of the first cooling pipeline 53 through brazing has been described, there is no limitation thereto. As another example, for example, the above-mentioned portion may be fixed by another means such as an adhesive agent or the like.

The attachment section 86 protrudes from the fixed section 85 toward a rear side of the vehicle body. The attachment section 86 is fixed to the upper surface 72a of the lower reinforcement member 72 by a fastening member.

Specifically, the attachment section 86 protrudes along the upper surface 72a of the lower reinforcement member 72 and has an attachment hole. A nut 87 is welded to the upper surface of the attachment section 86 coaxially with the attachment hole. A bolt 88 is screwed to the nut 87. Specifically, the bolt 88 is screwed to the nut 87 while passing through the attachment hole of the attachment section 86 from a lower surface 72b of the lower reinforcement member 72. Accordingly, the attachment section 86 (i.e., the pipeline fixing member 74) is attached to the upper surface 72a of the lower reinforcement member 72.

Further, in the embodiment, while the bolt 88 and the nut 87 have been exemplified as a fastening member configured to fix the attachment section 86 to the upper surface 72a of the lower reinforcement member 72, there is no limitation thereto. As another example, for example, spot welding, a rivet, or the like, may be used.

Here, the fixed left end portion 85a is fixed to the second outer circumferential surface of the second cooling pipeline 54. In addition, the fixed right end portion 85b is fixed to the first outer circumferential surface of the first cooling pipeline 53. Accordingly, the first cooling pipeline 53 and the second cooling pipeline 54 are fixed to the upper surface 72a of the lower reinforcement member 72 via the pipeline fixing member 74. In this state, the first cooling pipeline 53 and the second cooling pipeline 54 are provided between the lower reinforcement member 72 and the floor tunnel 66.

In this way, the first cooling pipeline 53 and the second cooling pipeline 54 are fixed to the upper surface 72a of the lower reinforcement member 72 via the pipeline fixing member 74. In this state, the lower reinforcement member 72 is attached to the lower surfaces 64b and 65b of the floor panel 16. Accordingly, the first cooling pipeline 53 and the second cooling pipeline 54 can be easily assembled to the lower structure 12.

In addition, the first cooling pipeline 53 and the second cooling pipeline 54 are fixed to the upper surface 72a of the lower reinforcement member 72 via the pipeline fixing member 74, and the high voltage electrical wire 56 is supported by the lower reinforcement member 72. Accordingly, the lower reinforcement member 72 may also function as a member configured to support the first cooling pipeline 53, the second cooling pipeline 54 and the high voltage electrical wire 56.

That is, the member configured to support the first cooling pipeline 53, the second cooling pipeline 54 and the high voltage electrical wire 56 may also function as the lower reinforcement member 72. Accordingly, the attachment strength of the first cooling pipeline 53 and the second cooling pipeline 54 or the support strength of the high voltage electrical wire 56 can be improved with no increase of the member configured to support the first cooling pipeline 53, the second cooling pipeline 54 and the high voltage electrical wire 56.

Further, as shown in FIG. 5, the high voltage electrical wire 56 is disposed on the side closer to the center in the vehicle width direction compared to the first cooling pipeline 53 and the second cooling pipeline 54. Accordingly, the high voltage electrical wire 56 can be separated from a portion to which the impact load F1 due to the side collision is input (for example, the left side sill 14). Accordingly, when the impact load F1 is input from a side of the vehicle body due to the side collision, in particular, transmission of the impact load F1 to the high voltage electrical wire 56 can be minimized, and deformation of the high voltage electrical wire 56 can be suppressed.

As shown in FIG. 6 and FIG. 7, the over-tunnel reinforcement member 76 is provided above the floor tunnel 66 and the floor cross member 35. The over-tunnel reinforcement member 76 has an upper reinforcement central section 91, an upper reinforcement front protruding section 92 and an upper reinforcement rear protruding section 93.

The upper reinforcement central section 91 is provided above the floor tunnel 66. The upper reinforcement central section 91 has an upper central area 91a, an upper left side area 91b and an upper right side area 91c. The upper central area 91a is disposed above, for example, the floor tunnel 66 (i.e., the tunnel apex section 66a, the left tunnel inclined wall 66b and the right tunnel inclined wall 66c) at an interval.

The upper left side area 91b extends from a left side of the upper central area 91a toward a left side in the vehicle width direction. The upper left side area 91b is formed along a right end portion of the left member protruding section 37a. The upper right side area 91c extends from a right side of the upper central area 91a toward a right side in the vehicle width direction. The upper right side area 91c is formed along a left end portion of the right member protruding section 38a.

The upper reinforcement front protruding section 92 overhangs from a front side of the upper reinforcement central section 91 toward a front side of the vehicle body along the floor panel 16. The upper reinforcement front protruding section 92 is formed along the floor tunnel 66 (i.e., the tunnel apex section 66a, the left tunnel inclined wall 66b and the right tunnel inclined wall 66c), the right end portion 37d of the left member front protruding section 37b, and the left end portion 38d of the right member front protruding section 38b.

The upper reinforcement front protruding section 92 has a left end portion 92a that overlaps the right end portion 37d of the left member front protruding section 37b from above. A bolt 95 passes through the left end portion 92a of the upper reinforcement front protruding section 92, the right end portion 37d of the left member front protruding section 37b, the right side of the left floor panel section 64 and the front end portion 82a of the lower reinforcement left side portion 82 and is screwed to a nut 96. That is, the left end portion 92a of the upper reinforcement front protruding section 92 and the front end portion 82a of the lower reinforcement left side portion 82 are fastened by the bolt 95 and the nut 96 via the right side of the left floor panel section 64.

In addition, the upper reinforcement front protruding section 92 has a right end portion 92b that overlaps the left end portion 38d of the right member front protruding section 38b from above. The bolt 95 passes through the right end portion 92b of the upper reinforcement front protruding section 92, the left end portion 38d of the right member front protruding section 38b, the left side of the right floor panel section 65 and the front end portion 83a of the lower reinforcement right side portion 83 and is screwed to the nut 96. That is, the right end portion 92b of the upper reinforcement front protruding section 92 and the front end portion 83a of the lower reinforcement right side portion 83 are fastened by the bolt 95 and the nut 96 via the left side of the right floor panel section 65.

The upper reinforcement rear protruding section 93 overhangs from the rear side of the upper reinforcement central section 91 toward the rear side of the vehicle body along the floor panel 16. The upper reinforcement front protruding section 92 is formed along the floor tunnel 66 (i.e., the tunnel apex section 66a, the left tunnel inclined wall 66b and the right tunnel inclined wall 66c), the right end portion 37e of the left member rear protruding section 37c, and the left end portion 38e of the right member rear protruding section 38c.

The upper reinforcement rear protruding section 93 has a left end portion 93a that overlaps the right end portion 37e of the left member rear protruding section 37c from above. The bolt 95 passes through the left end portion 93a of the upper reinforcement rear protruding section 93, the right end portion 37e of the left member rear protruding section 37c, the right side of the left floor panel section 64 and the rear end portion 82b of the lower reinforcement left side portion 82 and is screwed to the nut 96. That is, the left end portion 93a of the upper reinforcement rear protruding section 93 and the rear end portion 82b of the lower reinforcement left side portion 82 are fastened by the bolt 95 and the nut 96 via the right side of the left floor panel section 64.

The upper reinforcement rear protruding section 93 has a right end portion 93b that overlaps the left end portion 38e of the right member rear protruding section 38c from above. The bolt 95 passes through the right end portion 93b of the upper reinforcement rear protruding section 93, the left end portion 38e of the right member rear protruding section 38c, the left side of the right floor panel section 65 and the rear end portion 83b of the lower reinforcement right side portion 83 and is screwed to the nut 96. That is, the right end portion 93b of the upper reinforcement rear protruding section 93 and the rear end portion 83b of the lower reinforcement right side portion 83 are fastened by the bolt 95 and the nut 96 via the left side of the right floor panel section 65.

Accordingly, the over-tunnel reinforcement member 76 and the lower reinforcement member 72 are fixed by the plurality of bolts 95 and nuts 96 with the floor panel 16 interposed therebetween. In this state, the over-tunnel reinforcement member 76 is disposed above the floor tunnel 66, and further, is fixed to an upper surface 16a of the floor panel 16 by the plurality of bolts 95 and nuts 96 via the floor cross member 35.

In the embodiment, while the example in which the over-tunnel reinforcement member 76 is fixed to the upper surface 16a of the floor panel 16 by the bolt 95 and the nut 96 has been described, there is no limitation thereto. As another example, for example, the over-tunnel reinforcement member 76 can also be fixed to the upper surface 16a of the floor panel 16 through spot welding, a rivet, or the like.

In this way, the over-tunnel reinforcement member 76 is provided above the floor tunnel 66, and the over-tunnel reinforcement member 76 and the lower reinforcement member 72 are fixed together (collectively) via the floor panel 16. Accordingly, the over-tunnel reinforcement member 76 can be strongly supported by the lower reinforcement member 72. That is, coupling strength of the over-tunnel reinforcement member 76 can be improved, and strength of the over-tunnel reinforcement member 76 with respect to the impact load due to the side collision can be improved.

Accordingly, when the impact load F1 is input from a side of the vehicle body due to the side collision, deformation of the lower structure 12 (in particular, the floor tunnel 66 of the vehicle body) can be more appropriately suppressed.

Incidentally, the vehicle 10 includes the motor 50 on the rear end portion 12a of the lower structure 12, and includes the radiator 61 or the condenser 62 on the front end portion 12b of the lower structure 12. The motor 50 is cooled by the radiator 61. The first cooling pipeline 53 and the second cooling pipeline 54 configured to cool the motor 50 extend in the vehicle body forward/rearward direction.

Here, for example, rigidity of the floor tunnel 66 with respect to the impact load F1 in the vehicle width direction generated due to the side collision can be secured by the lower reinforcement member 72. Further, a space 98 is secured between the floor tunnel 66 and the lower reinforcement member 72. Since the first cooling pipeline 53 and the second cooling pipeline 54 are disposed in the space 98, the first cooling pipeline 53 and the second cooling pipeline 54 can extend in the vehicle body forward/rearward direction.

In addition, since the high voltage electrical wire 56 is provided in the space 98, the high voltage electrical wire 56 can extend in the vehicle body forward/rearward direction.

Accordingly, a large space 99 below the floor panel 16 can be secured. Accordingly, in a state in which a capacity of the battery 45 is largely secured, the first cooling pipeline 53 and the second cooling pipeline 54 can extend in the vehicle body forward/rearward direction, and the radiator 61 can be connected to the motor 50 by the first cooling pipeline 53 and the second cooling pipeline 54. Further, the battery 45 can be connected to the motor 50 by the high voltage electrical wire 56.

Further, the floor panel 16 is provided below the tunnel apex section 66a of the floor tunnel 66. In addition, the lower reinforcement member 72 is provided on the lower surfaces 64b and 65b of the floor panel 16. That is, the lower reinforcement member 72 bridges between the lower surface 64b of the left floor panel section 64 on the right side and the lower surface 65b of the right floor panel section 65 on the left side. Accordingly, the opening section 67 of the lower end portion of the floor tunnel 66 is connected to the lower reinforcement member 72 in the vehicle width direction.

Accordingly, rigidity of the floor tunnel 66 with respect to the impact load F1 in the vehicle width direction generated due to the side collision is secured. Accordingly, when the impact load F1 is input from a side of the vehicle body due to the side collision, deformation of the lower structure 12 (in particular, the floor tunnel 66) can be suppressed.

In addition, the space 98 is formed between the lower reinforcement member 72 and the floor tunnel 66, and the first cooling pipeline 53, the second cooling pipeline 54 and the high voltage electrical wire 56 are provided in the space 98. Accordingly, the space 98 between the lower reinforcement member 72 and the floor tunnel 66 can be effectively used.

That is, space efficiency of the lower structure 12 can be improved. Accordingly, rigidity of the floor tunnel 66 can be secured without individually providing cross members for reinforcement on the lower surfaces 64b and 65b of the floor panel 16. Accordingly, the space 98 below the floor panel 16 can be largely formed, and a large capacity for the battery pack 28 (i.e., the battery 45) can be secured.

Further, the technical scope of the present invention is not limited to the above-mentioned embodiment and various modifications may be made without departing from the scope of the present invention.

For example, in the embodiment, while the example in which the driving source 50 is provided on the rear end portion 12a of the lower structure 12 and the cooling apparatus 60 is provided on the front end portion 12b of the lower structure 12 has been described, there is no limitation thereto. As another example, for example, the driving source 50 may be provided on the front end portion 12b of the lower structure 12, and the cooling apparatus 60 may also be provided on the rear end portion 12a of the lower structure 12.

In addition, in the embodiment, while the example in which three of the first cooling pipeline 53, the second cooling pipeline 54 and the high voltage electrical wire 56 serving as routing members are disposed in the space 98 between the floor tunnel 66 and the lower reinforcement member 72 has been described, there is no limitation thereto. As another example, the same effect as that of the embodiment is obtained even when routing members other than the three members are disposed in the space 98.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body structure comprising:
   a battery pack provided below a floor panel;
   a floor tunnel provided on the floor panel and protruding upward; and
   a reinforcement member fixed to a lower surface of the floor panel below an apex section of the floor tunnel and extending in a vehicle width direction,
   wherein a routing member is provided between the reinforcement member and the floor tunnel,
   wherein the routing member is constituted by:
   a cooling pipeline configured to cool a driving source of a vehicle body rear section; and
   an electrical wire configured to supply electric power to the driving source, and
   the electrical wire is disposed on a side closer to a central in the vehicle width direction compared to the cooling pipeline.

2. The vehicle body structure according to claim 1, wherein the routing member is fixed to the reinforcement member.

3. The vehicle body structure according to claim 1, wherein a cross member extending in the vehicle width direction is provided in the battery pack, and
   the reinforcement member is disposed above the cross member.

4. The vehicle body structure according to claim 1, wherein an over-tunnel reinforcement member disposed above the floor tunnel and fixed to an upper surface of the floor panel is provided, and
   the over-tunnel reinforcement member and the reinforcement member are fixed with each other via the floor panel.

5. The vehicle body structure according to claim 1, comprising:
   a driving source provided on the vehicle body rear section; and
   a cooling apparatus provided on a vehicle body front section and configured to cool the driving source.

* * * * *